United States Patent [19]

Sasagawa et al.

[11] Patent Number: 4,522,993
[45] Date of Patent: Jun. 11, 1985

[54] RESIN FOR HIGH-REFRACTIVITY LENSES AND LENSES MADE OF SAME RESIN

[75] Inventors: Katsuyoshi Sasagawa; Akio Hyugaji; Masao Imai, all of Yokohama, Japan

[73] Assignee: Mitsui Toatsu Chemicals, Incorporated, Tokyo, Japan

[21] Appl. No.: 592,826

[22] PCT Filed: Jul. 7, 1983

[86] PCT No.: PCT/JP83/00218

§ 371 Date: Mar. 2, 1984

§ 102(e) Date: Mar. 2, 1984

[30] Foreign Application Priority Data

Jul. 8, 1982 [JP] Japan .................................. 57-117821

[51] Int. Cl.³ .................................................. C08F 212/32
[52] U.S. Cl. .................................. 526/292.4; 523/106; 525/937; 351/160 H; 351/160 R; 351/168
[58] Field of Search ................ 526/292.4, 292.5; 523/106; 351/160 H, 160 R, 168; 525/937

[56] References Cited

U.S. PATENT DOCUMENTS 4,393,184  7/1983  Tarumi et al. .................... 526/292.4

*Primary Examiner*—Paul R. Michl
*Assistant Examiner*—Alex H. Walker
*Attorney, Agent, or Firm*—Fisher, Christen & Sabol

[57] ABSTRACT

Disclosed herein are a resin for high-refractivity lenses, formed by copolymerizing at least one nucleus-halogenated benzene dicarboxylate represented by the following general formula (I):

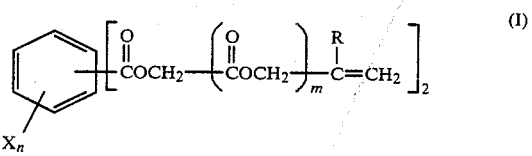

wherein X means a chlorine or bromine atom, n is 2 or 4, m stands for 0 or 1 and R denotes a hydrogen atom or a methyl group with at least one unifunctional monomer having a refractive index of at least 1.55 as a homopolymer, capable of undergoing a radical polymerization and containing an aromatic ring as well as high-refractivity lenses made of such a resin. The lens-making resin according to this invention features a high refractive index, excellent processability such as superb grinding processability and high impact resistance, outstanding miscibility between the unifunctional monomer and bifunctional monomer upon copolymerization thereof, and minimized polymerization strain.

18 Claims, No Drawings

4,522,993

RESIN FOR HIGH-REFRACTIVITY LENSES AND LENSES MADE OF SAME RESIN

DESCRIPTION

1. Technical Field

This invention relates to a lens-making resin having a high refractive index and a lens made of the above resin.

2. Background Art

Plastic lenses have found increasing commercial utility as eyeglass lenses, camera lenses and other optical lenses in recent years, since they are lighter in weight, less fragile and more readily colored in comparison with inorganic glass lenses. As a resin which is currently used in a large volume for the above application, there is a resin obtained by the casting-polymerization of diethylene glycol bisallylcarbonate (hereinafter called "CR-39"). However, the refractive index ($n_d$) of the above resin is 1.50, which is smaller compared with those of inorganic glass lenses ($n_d$=about 1.52). In order to achieve the same optical characteristics as glass lenses, it is necessary to increase the central thickness, peripheral thickness and curvature of each plastic lens, thereby unavoidably making the plastic lens thicker as a whole. For this reason, there is an outstanding desire for the development of a lens-making resin having a still higher refractive index. As resins having high refractive indexes, there have already been known polycarbonate ($n_d$=1.58-1.59), polystyrene ($n_d$=1.58-1.60), etc. These resins are each a two-dimensional polymer structurally and thermoplastic. They are thus unsuitable for casting-polymerization method which is suitable for production of articles in various models such as fabrication of eyeglass lenses, and their post-molding processings, especially, their rough-grinding and smoothing (hereinafter merely referred to as "grinding") work is difficult. Therefore, use of these resins are presently limited to some sort of safety eyeglasses and the like.

Accordingly, there is a strong desire for the development of a lens-making resin which has a refractive index higher than that of the lens-making resin prepared by polymerizing CR-39, can be cast-polymerized similar to CR-39 and does not make diamond-made grindstones loaded owing to its three-dimensional crosslinking structure when grinding molded lens blanks. A variety of researches has already been carried out with a view toward developing a resin which would meet the above-mentioned desire, resulting in proposals of resins obtained by copolymerizing CR-39 and second monomers having refractive indexes higher than that of CR-39 when measured as their respective homopolymers (see, Japanese Patent Laid-open Nos. 79353/1976, 7787/1978, 77686/1979, 15118/1980 and 36601/1981). The refractive indexes of the thus-copolymerized resins are however inherently limited because they employ CR-39 as their principal components. It was thus difficult to obtain a resin having a high refractive index, for example, a refractive index of 1.55 or higher.

In order to obtain a resin having a still higher refractive index, it is urged to use a bifunctional monomer which can afford a homopolymer having a refractive index higher than that of CR-39. However, each of bifunctional monomers which have been proposed to date resulted in a polymer having impact resistance much poorer compared with the homopolymer of CR-39 when polymerized singly. Thus, some attempts have been made to improve the impact resistance of these bifunctional monomers by copolymerizing them with a unifunctional monomer. Here, each matching unifunctional monomer is required to have a high refractive index when measured as its homopolymer if one wants to obtain a copolymer having a high refractive index. For this reason, styrene or a halogen-substituted styrene is presently used as such a unifunctional monomer. However, use of bifunctional monomers different from CR-39, which have heretofore been proposed, in combination with the above-mentioned unifunctional monomers is accompanied by such drawbacks that it tends to result in development of polymerization strain and is difficult to obtain polymers having uniform refractivity distribution because there are considerable differences in polymerization reactivity between such bifunctional monomers and unifunctional monomers and the proportions of the bifunctional monomers and unifunctional monomers cannot be varied freely due to poor miscibility therebetween.

With the foregoing in view, the present inventors carried out an extensive research with a view toward making improvements to the above-described drawbacks. As a result, it has been found that a resin, which has a high refractive index and excellent processability such as grinding processability and superb impact resistance, exhibits excellent miscibility between its starting unifunctional monomer and bifunctional monomer upon copolymerization thereof, is less susceptible of developing polymerization strain and is thus suitable for use in the production of high-refractivity lenses, can be obtained by copolymerizing a specific bifunctional monomer and a unifunctional monomer having a refractive index of at least 1.55 as a homopolymer, capable of undergoing a radical polymerization and containing an aromatic ring, leading to completion of this invention.

DISCLOSURE OF THE INVENTION

This invention therefore provides a resin for high-refractivity lenses, formed by copolymerizing at least one nucleus-halogenated benzene dicarboxylate represented by the following general formula (I):

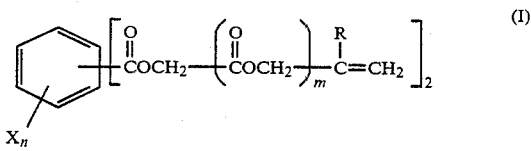

wherein X means a chlorine or bromine atom, n is 2 or 4, m stands for 0 or 1 and R denotes a hydrogen atom or a methyl group with at least one unifunctional monomer having a refractive index of at least 1.55 as a homopolymer, capable of undergoing a radical polymerization and containing an aromatic ring. This invention also provides lenses made of such a resin.

BEST MODE FOR CARRYING OUT THE INVENTION

The first monomer of this invention, namely, the nucleus-halogenated benzene dicarboxylate represented by the general formula (I) may be prepared by the esterification reaction between the acid chloride of its corresponding nucleus-halogenated benzenedicarboxylic acid and allyl alcohol or β-methylallyl alcohol or by the esterification reaction between the corresponding nucleus-halogenated benzenedicarboxylic acid and allyl chloroacetate or β-methylallyl chloroacetate in the presence of triethylamine or the like. As specific examples of the nucleus-halogenated benzene dicarboxylate represented by the general formula (I), may be mentioned:

Bisallyl 2,4-dichloroterephthalate;
Bis(β-methylallyl) 2,4-dichloroterephthalate;
Bis(allyloxycarbonylmethyl) 2,4-dichloroterephthalate;
Bis(β-methylallyloxycarbonylmethyl) 2,4-dichloroterephthalate;
Bisallyl 2,4-dibromoterephthalate;
Bis(β-methylallyl) 2,4-dibromoterephthalate;
Bis(allyloxycarbonylmethyl) 2,4-dibromoterephthalate;
Bis(β-methylallyloxycarbonylmethyl) 2,4-dibromoterephthalate;
Bisallyl tetrachloroterephthalate;
Bis(β-methylallyl) tetrachloroterephthalate;
Bis(allyloxycarbonylmethyl) tetrachloroterephthalate;
Bis(β-methylallyloxycarbonylmethyl) tetrachloroterephthalate;
Bisallyl tetrabromoterephthalate;
Bis(β-methylallyl) tetrabromoterephthalate;
Bis(allyloxycarbonylmethyl) tetrabromoterephthalate;
Bis(β-methylallyloxycarbonylmethyl) tetrabromoterephthalate;
Bisallyl tetrachlorophthalate;
Bis(β-methylallyl) tetrachlorophthalate;
Bis(allyloxycarbonylmethyl)tetrachlorophthalate;
Bis(β-methylallyloxycarbonylmethyl) tetrachlorophthalate;
Bisallyl tetrabromophthalate;
Bis(β-methylallyl) tetrabromophthalate;
Bis(allyloxycarbonylmethyl) tetrabromophthalate; and
Bis(β-methylallyloxycarbonylmethyl) tetrabromophthalate.

The ester represented by the general formula (I) is subjected to copolymerization in the present invention, using as a second monomer a unifunctional monomer having a refractive index of at least 1.55 as a homopolymer, capable of undergoing a radical polymerization and containing an aromatic ring because the impact resistance of a polymer obtained by polymerizing the ester alone is too small. Any monomer may be used as the above-mentioned second monomer so long as it satisfies the above-described requirements. However, when it was subjected to copolymerization with the ester represented by the general formula (I) to obtain a resin, it is not preferable the resin exhibits poor light resistance, that is, it takes a color extremely when it was exposed to ultraviolet rays. As representative specific examples such monomers that it is generally preferred to use may be mentioned:

Acrylates or Methacrylates Containing Aromatic Rings

For example, phenyl acrylate, phenyl methacrylate, nucleus-chlorinated phenyl acrylates, nucleus-chlorinated phenyl methacrylates, nucleus-brominated phenyl acrylates, nucleus-brominated phenyl methacrylates, benzyl acrylate, benzyl methacrylate, nucleus-chlorinated benzyl acrylates, nucleus-chlorinated benzyl methacrylates, nucleus-brominated benzyl acrylates, nucleus-brominated benzyl methacrylates, α-naphthyl acrylates, α-naphthyl methacrylates, β-naphthyl acrylates and β-naphthyl methacrylates.

Styrenes

For example, styrene, nucleus-chlorinated styrenes and nucleus-brominated styrenes.

Vinyl Naphthalenes

For example, 1-vinyl naphthalene and 2-vinyl naphthalene.

Among these, in order to obtain a resin which has superb impact resistance, it is preferred to use phenyl methacrylate, nucleus-halogenated methacrylates, benzyl methacrylate or nucleus-halogenated benzyl methacrylates.

In the present invention, the proportion of each ester represented by the general formula (I) cannot be limited to any specific value or range because its preferred proportion may vary depending on the type of the ester. However, the ester of the general formula (I) may be used at a proportion of 10–80 wt. % or, preferably 10–70 wt. %. If the ester is incorporated at any proportion lower than 10 wt. %, the resultant, copolymerized resin will have an extremely low surface hardness. Any proportions in excess of 80 wt. % are not preferred because the impact resistance will be lowered. Accordingly, it is preferred to use one or more of the above-described second monomers, which are copolymerized with the ester represented by the general formula (I), at a total proportion of 20–90 wt. %.

Furthermore, no particular limitation is vested on the type of a radical polymerization initiator which is to be used upon conducting a copolymerization so as to obtain a lens-making resin according to this invention. It is thus preferable to use, at a proportion of 0.01–5 wt. %, a conventional peroxide such as benzoyl peroxide, p-chlorobenzoyl peroxide, diisopropyl peroxycarbonate, di-2-ethylhexyl peroxycarbonate or tertiary butyl peroxypivalate or a known azo compound such as azobisisobutyronitrile.

The lens-making resin according to this invention can be prepared by subjecting a mixture of at least one ester represented by the general formula (I), at least one of the above-described second monomer and a radical polymerization initiator to the known casting-polymerization method, in other words, pouring the mixture into a mold formed of a gasket or spacer and a glass-made or metallic mold and polymerizing and hardening the mixture by heating it at temperatures in the range of 50°–120° C. or irradiating ultraviolet rays to the mixture. Here, it may be possible to incorporate one or more appropriate additives such as ultraviolet stabilizer, antioxidant, coloring inhibitor, fluorescent dye and/or the like to the mixture prior to its polymerization as needed.

The thus-obtained lens-making resin according to this invention has a high refractive index, excellent processability such as superb grinding processability and outstanding impact resistance and can thus be used for eyeglass lenses, camera lenses and other optical lenses.

Some examples of this invention will hereinafter be described, in which all designations of "part" or "parts" mean part or parts by weight and all designations of "%" mean wt. %. Incidentally, the following testing methods were employed to determine the refractive indexes, grinding processability, impact resistance and extents of yellowing upon exposure to ultraviolet rays of the lens-making resins obtained in the examples.

Refractive Indexes:

Measured at 20° C. by an Abbe refractometer.

Processability:

Each molded lens blank was ground by a grinding machine designed to process eyeglass lenses. Samples bearing smooth ground surfaces were judged acceptable and marked by circles (◯).

Impact Resistance:

A falling ball impact test was carried out in accordance with the FDA standards on planar plates having the thickness of 2 mm at their centers. Unbroken samples were judged as acceptable and marked by circles (◯).

Ultraviolet Resistance Test:

Lens samples were placed in a Weather-O-Meter equipped with a Sunshine carbon arc-lamp. After an elapsed time of 200 hours, the lens samples were taken out of the Weather-O-Meter and their hues were compared with their hues prior to the testing in the Weather-O-Meter. Results were evaluated and marked as follows:

◯ ... Unchanged.
Δ ... Slightly yellowed.
× ... Yellowed.

SYNTHESIS EXAMPLE 1

To a liquid mixture consisting of 34 parts of tetrachloroterephthalic acid dichloride, 34 parts of carbon tetrachloride and 3.4 parts of triethylamine, were added dropwise 15 parts of allyl alcohol. The resultant mixture was heated until carbon tetrachloride started to reflux. The mixture was maintained at the temperature for 5 hours. After allowing the reaction mixture to cool, the liquid reaction mixture was poured in a separation funnel and washed with dilute hydrochloric acid and water. The organic layer was then dried with calcium chloride and then filtered. Activated carbon was added to the filtrate and mixed therewith. The resultant mixture was filtered and the resulting filtrate was concentrated to give 28 parts of diallyl tetrachloroterephthalate as a colorless, clear, semi-solid matter (hereinafter called "Compound A"). It was recrystallized from ligroin, thereby obtaining 23 parts of acicular crystals (m.p. 71°–73° C.).

Elementary analysis: Calculated for $C_{14}H_{10}Cl_4O_4$: C, 43.79; H, 2.62; Cl, 36.93. Found: C, 43.69; H, 2.53; Cl, 36.99.

NMR: $\delta CDCl_3$ = 4.90 (4H, d), 5.35 (4H, t), 5.80~6.20 (2H, m).

SYNTHESIS EXAMPLE 2

To a liquid mixture consisting of 19.3 parts of tetrabromoterephthalic acid and 40 parts of isopropyl alcohol, were added with stirring 13 parts of a 50% aqueous solution of caustic potash. After continuously mixing the thus-obtained mixture for 30 minutes, 12.6 parts of allyl bromide and 1.0 part of triethylamine were added. The resulting mixture was heated until isopropanol started to reflux. The mixture was maintained at the temperature for 8 hours. After allowing the resulting reaction mixture to cool, the liquid reaction mixture was concentrated under reduced pressures, followed by an addition of 50 parts of chloroform to dissolve the residue. The resultant solution was poured in a separation funnel and then washed with an aqueous solution of sodium bicarbonate and thereafter with water. The organic layer was concentrated and the resultant white solid was recrystallized from ethyl acetate, thereby obtaining 12 parts of diallyl tetrabromoterephthalate (hereinafter called "Compound B") as white irregular crystals (m.p. 125°–127° C.).

Elementary analysis: Calculated for $C_{14}H_{10}Br_4O_4$: C, 29.90; H, 1.79; Br, 56.90. Found: C, 29.89; H, 1.61; Br, 56.90.

NMR: $\delta CDCl_3$ = 4.90 (4H, d), 5.40 (4H, t), 5.80~6.25 (2H, m).

SYNTHESIS EXAMPLE 3

The procedures of Synthesis Example 1 were followed except that 34 parts of tetrachlorophthalic acid dichloride were used in lieu of 34 parts of tetrachloroterephthalic acid dichloride, thereby obtaining 26 parts of diallyl tetrachlorophthalate (hereinafter called "Compound C") as a colorless, clear and viscous liquid. A portion of the liquid was recrystallized from ligroin to give columnar crystals (m.p. 71°–72° C.).

Elementary analysis: Calculated for $C_{14}H_{10}Cl_4O_4$: C, 43.79; H, 2.62; Cl, 36.93. Found: C, 43.66; H, 2.58; Cl, 36.87.

NMR: $\delta CDCl_3$ = 4.85 (4H, d), 5.40 (4H, t), 5.80~6.25 (2H, m).

SYNTHESIS EXAMPLE 4

The procedures of Synthesis Example 2 were repeated except that 13.0 parts of 2,4-dibromoterephthalic acid and 14.1 parts of β-methylallyl bromide were respectively used instead of 19.3 parts of tetrabromoterephthalic acid and 12.6 parts of allyl bromide. The resulting organic layer was treated with activated carbon and then concentrated, thereby obtaining 13 parts of bis(β-methylallyl) 2,4-dibromoterephthalate (hereinafter called "Compound D") as a glassy solid.

Elementary analysis: Calculated for $C_{16}H_{16}Br_2O_4$: C, 44.47; H, 3.73; Br, 36.99. Found: C, 43.95; H, 3.92; Br, 37.05.

NMR: $\delta CDCl_3$ = 7.30 (2H, s), 5.00 (4H, d), 1.75 (6H, s).

SYNTHESIS EXAMPLE 5

To a liquid mixture consisting of 24 parts of tetrabromoterephthalic acid and 60 parts of chloroform, were dropped with stirring 20 parts of allyl chloroacetate. Thereafter, 13 parts of triethylamine were added dropwise while cooling the resulting mixture at 15°–20° C. The mixture was heated until chloroform started to reflux. At the same temperature, the mixture was maintained for 8 hours. After allowing the liquid reaction mixture to cool, it was poured in a separation funnel and washed first with dilute hydrochloric acid and then with water. The organic layer was concentrated under reduced pressures and the resulting white solid was recrystallized from ethyl acetate, thereby obtaining 25 parts of bis(allyloxycarbonylmethyl) tetrabromoterephthalate (hereinafter called "Compound E") as white irregular crystals. (m.p. 146°–148° C.).

Elementary analysis: Calculated for $C_{18}H_{14}Br_4O_8$: C, 31.89; H, 2.08; Br, 47.15. Found: C, 31.83; H, 2.12; Br, 47.08.

NMR: $\delta CDCl_3$ = 4.70 (4H, d), 4.88 (4H, s), 5.33 (4H, t), 5.75~5.18 (2H, m).

SYNTHESIS EXAMPLE 6

The procedures of Synthesis Example 2 were repeated except that 19.3 parts of tetrabromophthalic acid and 9.2 parts of β-methyl-allyl chloride were employed instead of 19.3 parts of tetrabromoterephthalic acid and 12.6 parts of allyl bromide respectively. The thus-obtained white solid was recrystallized from ligroin to obtain 10 parts of bis(β-methyl-allyl) tetrabromophthalate (hereinafter called "Compound F") as colorless columnar crystals (m.p. 80°–82° C.).

Elementary analysis: Calculated for $C_{16}H_{14}Br_4O_4$: C, 32.58; H, 2.39; Br, 54.18. Found: C, 32.55; H, 2.43; Br, 53.98.

NMR: $\delta CDCl_3 = 1.83$ (6H, s), 4.72 (4H, s), 5.06 (4H, d).

EXAMPLE 1

A liquid mixture, which had been obtained by mixing 50 parts of diallyl tetrachlorophthalate, 50 parts of phenyl methacrylate and 0.2 part of benzoyl peroxide was poured into a mold which was formed of a glass mold and a polyethylene gasket. It was held at 60° C. for 24 hours, at 80° C. for 2 hours and at 100° C. for 2 hours to carry out the copolymerization of the contents. The thus-formed resin was next taken out of the mold, on which a refractivity measurement, processability test, impact resistance test and ultraviolet resistance test were conducted. As results of such a measurement and tests, it was found that the thus-obtained colorless transparent lens had the refractive index of 1.585 and good ultraviolet ray resistance.

EXAMPLES 2–14

In the same manner as in Example 1, monomers were copolymerized at different proportions to prepare lenses. Results are shown in Table 1, together with results of Comparative Examples 1–5.

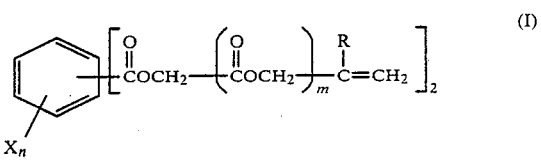

wherein X is a chlorine atom or a bromine atom, n is 2 or 4, m is 0 or 1 and R is a hydrogen atom or a methyl group, with 30 to 90 weight percent of at least one unifunctional monomer which has a refractive index of at least 1.55 as a homopolymer, is capable of undergoing a radical polymerization and contains an aromatic ring.

2. Resin as claimed in claim 1 wherein, in formula (I), X is chlorine.

3. Resin as claimed in claim 1 wherein, in formula (I), X is bromine.

4. Resin as claimed in claim 1 wherein, in formula (I), R is hydrogen.

5. Resin as claimed in claim 1 wherein, in formula (I), R is methyl.

6. Resin as claimed in claim 1 wherein, in formula (I), m is 0.

7. Resin as claimed in claim 1 wherein, in formula (I), m is 1.

8. Resin as claimed in claim 1 wherein the unifunctional monomer is an acrylate containing an aromatic ring, a methacrylate containing an aromatic ring, a

TABLE 1

| | Composition of Polymers | (parts) | Refractive Index $n_d^{20}$ | Grinding Processability | Impact Resistance | Ultraviolet Resistance Test |
|---|---|---|---|---|---|---|
| Example | | | | | | |
| 1 | A/PhMA | (50/50) | 1.583 | O | O | O |
| 2 | A/p-BrPhMA | (40/60) | 1.604 | O | O | O |
| 3 | A/o-ClSt | (70/30) | 1.600 | O | O | O |
| 4 | B/PhMA | (50/50) | 1.591 | O | O | O |
| 5 | B/o-ClBMA | (40/60) | 1.594 | O | O | O |
| 6 | B/o-ClSt | (70/30) | 1.606 | O | O | O |
| 7 | C/PhMA | (50/50) | 1.585 | O | O | O |
| 8 | C/o-ClBMA | (40/60) | 1.590 | O | O | O |
| 9 | D/PhMA | (50/50) | 1.584 | O | O | O |
| 10 | D/p-BrPhMA | (40/60) | 1.598 | O | O | O |
| 11 | E/PhMA | (50/50) | 1.573 | O | O | O |
| 12 | E/BrSt | (70/30) | 1.602 | O | O | O |
| 13 | F/PhMA | (50/50) | 1.600 | O | O | O |
| 14 | F/St | (70/30) | 1.617 | O | O | O |
| Comparative Example | | | | | | |
| 1 | CR-39 | (100) | 1.498 | O | O | O |
| 2 | CR-39/PhMA | (50/50) | 1.532 | O | O | O |
| 3 | DAP/PhMA | (50/50) | 1.536 | O | O | O |
| 4 | CR-39/o-ClSt | (70/30) | 1.533 | X | O | Δ |
| 5 | DAP/BrSt | (70/30) | 1.544 | X | X | Δ |

Note:
PhMA — Phenylmethacrylate.
o-ClBMA — o-Chlorobenzylmethacrylate.
p-BrPhMA — p-Bromophenylmethacrylate.
Br—St — Bromostyrene (o-isomer: 70 wt. %; p-isomer: 30 wt. %).
o-ClSt — o-Chlorostyrene.
DAP — Diallyl phthalate.
St — Styrene.

We claim:

1. A resin for high-refractivity lenses, formed by copolymerizing 10 to 70 weight percent of at least one nucleus-halogenated benzene dicarboxylate having the following formula (I):

styrene or a vinyl naphthalene.

9. Resin as claimed in claim 1 wherein the unifunctional monomer is phenyl acrylate, phenyl methacrylate, a nucleus-chlorinated phenyl acrylate, a nucleus-chlorinated phenyl methacrylate, a nucleus-brominated phenyl acrylate, a nucleus-brominated phenyl methacrylate, benzyl acrylate, benzyl methacrylate, a nucleus-chlorinated benzyl acrylate, a nucleus-chlorinated benzyl methacrylate, a nucleus-brominated benzyl acrylate, a nucleus-brominated benzyl methacrylate, an α-naphthyl acrylate, an α-naphthyl methacrylate, β-naphthyl acrylate, a β-naphthyl methacrylate, styrene, a nucleus-chlorinated styrene, a nucleus-brominated styrene, 1-vinyl naphthalene or 2-vinyl naphthalene.

10. A lens comprising a copolymer of 10 to 70 weight percent of at least one nucleus-halogenated benzene dicarboxylate having the following formula (I):

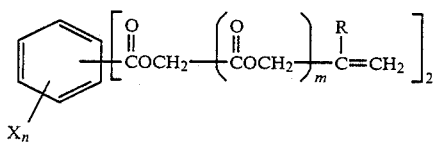

wherein X is a chlorine atom or a bromine atom, n is 2 or 4, m is 0 or 1 and R is a hydrogen atom or a methyl group, and 30 to 90 weight percent of at least one unifunctional monomer, which has a refractive index of at least 1.55 as a homopolymer, is capable of undergoing a radical polymerization and contains an aromatic ring.

11. Lens as claimed in claim 10 wherein, in formula (I), X is chlorine.

12. Lens as claimed in claim 10 wherein, in formula (I), X is bromine.

13. Lens as claimed in claim 10 wherein, in formula (I), R is hydrogen.

14. Lens as claimed in claim 10 wherein, in formula (I), R is methyl.

15. Lens as claimed in claim 10 wherein, in formula (I), m is 0.

16. Lens as claimed in claim 10 wherein, in formula (I), m is 1.

17. Lens as claimed in claim 10 wherein the unifunctional monomer is an acrylate containing an aromatic ring, a methacrylate containing an aromatic ring, a styrene or a vinyl naphthalene.

18. Lens as claimed in claim 10 wherein the unifunctional monomer is phenyl acrylate, phenyl methacrylate, a nucleus-chlorinated phenyl acrylate, a nucleus-chlorinated phenyl methacrylate, a nucleus-brominated phenyl acrylate, a nucleus-brominated phenyl methacrylate, benzyl acrylate, benzyl methacrylate, a nucleus-chlorinated benzyl acrylate, a nucleus-chlorinated benzyl methacrylate, a nucleus-brominated benzyl acrylate, a nucleus-brominated benzyl methacrylate, an α-naphthyl acrylate, an α-naphthyl methacrylate, a β-naphthyl acrylate, a β-naphthyl methacrylate, styrene, a nucleus-chlorinated styrene, a nucleus-brominated styrene, 1-vinyl naphthalene or 2-vinyl naphthalene.

* * * * *